United States Patent
Mustafa et al.

(10) Patent No.: US 11,632,287 B1
(45) Date of Patent: Apr. 18, 2023

(54) TRACKING AND REPORTING FAULTS DETECTED ON DIFFERENT PRIORITY LEVELS

(71) Applicant: Ciena Corporation, Hanover, MD (US)

(72) Inventors: Ghulam Mustafa, Aligarh (IN); Gagan Garg, Gurgaon (IN); Khujasta Afreen Mohsini, New Delhi (IN); Nilakantha Swain, Puri (IN)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/518,662

(22) Filed: Nov. 4, 2021

(30) Foreign Application Priority Data

Sep. 22, 2021 (IN) .............................. 202111042951

(51) Int. Cl.
*H04L 41/0604* (2022.01)
*H04L 43/0817* (2022.01)
*H04L 41/0631* (2022.01)

(52) U.S. Cl.
CPC ...... *H04L 41/0609* (2013.01); *H04L 41/0631* (2013.01); *H04L 43/0817* (2013.01)

(58) Field of Classification Search
CPC ............. H04L 41/0609; H04L 41/0631; H04L 43/0817
See application file for complete search history.

(56) References Cited

U.S. PATENT DOCUMENTS

| | | | |
|---|---|---|---|
| 6,970,167 B1 * | 11/2005 | Kumamoto | G06F 11/324 709/200 |
| 9,203,549 B2 | 12/2015 | Holness et al. | |
| 9,485,161 B2 | 11/2016 | Chhabra et al. | |
| 9,503,338 B2 | 11/2016 | Mishra et al. | |
| 9,602,374 B2 | 3/2017 | Mishra et al. | |
| 10,044,606 B2 | 8/2018 | Mishra et al. | |

(Continued)

FOREIGN PATENT DOCUMENTS

| | | |
|---|---|---|
| EP | 2 590 365 B1 | 9/2017 |
| EP | 2 983 329 B1 | 11/2017 |

(Continued)

OTHER PUBLICATIONS

DVB Organization, "Cable Data Services DOCSIS Provisioning of EPON Specifications," DPoE™ Service OAM Specification, DPoE-SP-SOAMv2.0-I01-130107, Nov. 23, 2013, pp. 155.

(Continued)

*Primary Examiner* — Brian Whipple
*Assistant Examiner* — James Ross Hollister
(74) *Attorney, Agent, or Firm* — Baratta Law PLLC; Lawrence A. Baratta, Jr.

(57) ABSTRACT

Systems and methods for tracking and reporting the existence or absence of faults in a Network Element (NE) or node of a network, network domain, or Maintenance Domain (MD) are provided. A method, according to one implementation, includes a step of tracking the existence or absence of a plurality of faults in a NE within a network domain. Each of the plurality of faults is categorized in one of a plurality of priority levels. In response to a detection of one or more new faults in the NE or a rectification of one or more old faults in the NE, the method further includes the step of updating a fault indication variable that individually signifies the existence or absence of a fault at each of the priority levels.

20 Claims, 4 Drawing Sheets

(56) References Cited

U.S. PATENT DOCUMENTS

| | | | |
|---|---|---|---|
| 10,097,372 B2 | 10/2018 | Bhattacharya et al. | |
| 10,142,203 B2 | 11/2018 | Jadav et al. | |
| 10,237,088 B2 | 3/2019 | Mishra et al. | |
| 10,491,318 B1 | 11/2019 | Alevoor et al. | |
| 10,721,139 B2 | 7/2020 | Holness et al. | |
| 10,862,706 B2 | 12/2020 | Sekhri et al. | |
| 2014/0189436 A1* | 7/2014 | Sadaphal | G06F 11/079 |
| | | | 714/45 |
| 2016/0352624 A1* | 12/2016 | Mishra | H04L 45/66 |
| 2018/0309615 A1* | 10/2018 | Batra | H04L 43/062 |
| 2019/0132261 A1 | 5/2019 | Vashisht et al. | |

FOREIGN PATENT DOCUMENTS

| | | |
|---|---|---|
| EP | 2 933 977 B1 | 6/2019 |
| KR | 20030025088 A | 3/2003 |

OTHER PUBLICATIONS

IEEE. "Virtual Bridged Local Area Networks," IEEE Standard for Local and Metropolitan area networks, Amendment 5: Connectivity Fault Management, IEEE std 802.1ag™—2007, Dec. 17, 2007, pp. 260.

Jan. 26, 2023, European Search Report issued in European Application No. EP 22 19 6703.

* cited by examiner

| DEFECT | | PRIORITY | |
|---|---|---|---|
| VARIABLE | HIGHEST DEFECT | HIGHEST PRIORITY | IMPORTANCE |
| xconCCMdefect | DefxconCCM | 5 | HIGHEST |
| errorCCMdefect | DefErrorCCM | 4 | |
| someRMEPCCMdefect | DefRemoteCCM | 3 | |
| someMACstatusdefect | DefMACstatus | 2 | |
| someRDIdefect | DefRCICCM | 1 | LOWEST |

30

40

TRACKING AND REPORTING FAULTS DETECTED ON DIFFERENT PRIORITY LEVELS

TECHNICAL FIELD

The present disclosure generally relates to networking systems and methods.

More particularly, the present disclosure relates to tracking faults that are detected in a network domain and reporting these faults.

BACKGROUND

Connectivity Fault Management (CFM), defined in the Institute of Electrical and Electronics Engineers (IEEE) standard IEEE 802.1Q (2018), is a practice associated with Operations, Administration, and Maintenance (OAM) systems in a network environment. CFM defines network domains, referred to as Maintenance Domains (MDs), which are sections of a network typically managed by a single entity. These domains (i.e., MDs) are usually divided into customer domains, provider domains, and operator domains. Also, CFM defines Maintenance association End Point (MEPs) as the points at the edge of the MDs and define boundaries for the domains. A MEP device is configured to send and receive CFM frames (or CFM packets) through the domain to enable the management of connectivity fault information. MDs may also include Maintenance domain Intermediate Points (MIPs), which are internal to the domain and not on the boundary and may be configured to forward CFM frames as needed for maintenance purposes.

CFM also defines Maintenance Associations (MAs) as sets of MEPs, where each MEP in an MA set are configured with the same Maintenance Association Identifier (MAID) and MD level. Also, each MEP in the set is configured with a MEP Identifier (MEPID) that is unique within the MA and MD levels.

IEEE 802.1Q (CFM) describes different protocols (e.g., Continuity Check Protocol (CCP), Link Trace (LT) protocol, Loop-Back (LB) protocol, etc.) that help network administrators debug faulty networks. A Continuity Check (CC) may include the detection of service cross-connect status (e.g., service ID mismatch), MEP configuration status (e.g., MEPID mismatch), missing or unexpected MEPs, and other conditions. The Continuity Check Protocol (CCP) is a protocol of CFM that describes the messages that may be transmitted for communicating this Continuity Check (CC) information, including continuity fault information. These transmitted messages are referred to as Continuity Check Messages (CCMs), which allow a way for the components (e.g., MEP devices, MIP devices, etc.) of the MD to detect, track, and report connectivity defects or failures in the MA. For example, these CCMs are typically multicast messages and are normally confined within the respective domain (MD). These messages (i.e., CCMs) are unidirectional and do not require an acknowledgement of receipt.

According to the conventional manner of operating a system within the IEEE 802.1Q environment, a MAdefectIndication is a Boolean variable indicating the operational state of the MEP's MA. True indicates that at least one of the remote MEPs configured on this MEP's MA has failed, and false indicates that either all are functioning, or that the MEP has been active for less than the time-out period. MAdefectIndication is true whenever an enabled defect is indicated. That is, MAdefectIndication is true if and only if, for one or more of the variables someRDIdefect, someRMEPCCMdefect, someMACstatusDefect, errorCCMdefect, or xconCCMdefect, that variable is true and the corresponding priority of that variable is greater than or equal to the value of the variable lowestAlarmPriority.

Currently, IEEE 802.1Q does not describe any way to communicate additional information with respect to reporting or clearing of continuity faults when multiple faults of different priorities are present on the CFM service at the same time. However, as explained below, additional information with respect to faults in an MA would be useful for various purposes and would therefore be an improvement over the conventional IEEE 802.1Q standard.

BRIEF SUMMARY

The present disclosure focuses on systems, methods, and non-transitory computer-readable media configured to track and report the fault status on a MEP in a MA on the Network Element (NE). According to one implementation, a computing system includes a processing device and a memory device configured to store a computer program. For example, the computer program may be configured with instructions that, when executed, enable the processing device to track the existence or absence of a plurality of faults in the NE within a network domain (e.g., MD). Each of the plurality of faults may be categorized in one of a plurality of priority levels. In response to a detection of one or more new faults in the NE or a rectification of one or more old faults in the NE, the instructions may further enable the processing device to update a fault indication variable that individually signifies the existence or absence of a fault at each of the priority levels.

In some implementations, the fault indication variable may be an extension of the MAdefectIndication variable defined in the Connectivity Fault Management (CFM) protocol of IEEE 802.1Q. The instructions may further enable the processing device to report/clear fault notifications based on the fault indication variable. The process of reporting fault notifications may include utilizing an Operations, Administration, and Maintenance (OAM) system.

The plurality of priority levels, for example, may include a highest priority level for tracking cross-connect (Xcon) Continuity Check Message (CCM) faults (DefXconCCM, DefErrorCCM, DefRemoteCCM, DefMACstatus, DefRDICCM), a second-highest priority level for tracking error CCM faults, a third-highest priority level for tracking Remote Maintenance End Point (RMEP) CCM faults, a fourth-highest priority level for tracking Media Access Control (MAC) status faults, and a fifth-highest priority level for tracking Remote Defect Indication (RDI) faults. The plurality of priority levels may be based on an impact that the respective faults have on service performance in the network domain.

According to some implementations, the fault indication variable may be stored as a new fault indication variable, wherein the instructions may further enable the processing device to compare the most significant set-bit of the new fault indication variable with the most significant set-bit of a previous fault indication variable to determine if the highest priority fault remains the same. If the highest priority fault does not remain the same from the previous fault indication variable to the new fault indication variable, the instructions further enable the processing device to report one or more alarms that signify a new highest priority level fault being set and an old highest priority level fault being cleared. Also, the fault indication variable may include one or more bits configured for signifying the highest priority level fault that exists in the NE.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
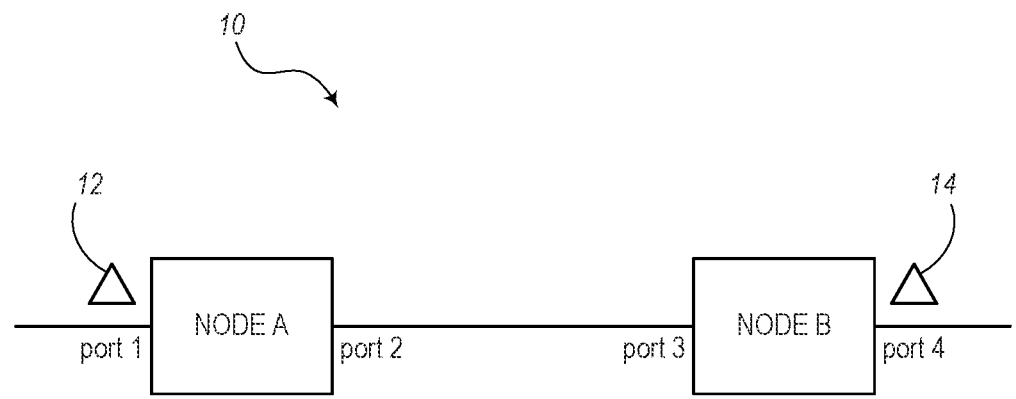
FIG. 1 is a block diagram illustrating a Maintenance Domain (MD) in which continuity faults are tracked and reported, according to various embodiments of the present disclosure.

The present disclosure relates to systems and methods for tracking and reporting faults or defect notifications (e.g., service faults) that are detected in a network domain, such on a MEP in a MA, defined in IEEE 802.1Q (also referred to as Connectivity Fault Management (CFM)). In particular, the present disclosure is directed to systems and methods for tracking and reporting Continuity Check (CC) faults, as described in the Continuity Check Protocol (CCP) of CFM. Maintenance End Points (MEPs), at the edges of a Maintenance Domain (MD), are configured to transmit Continuity Check Messages (CCMs) to other MEPs and Maintenance Intermediate Points (MIPs) within the MD, and also detect faults from other MEPs. The information in the CCMs may be useful for the various components of the MD for maintenance and control.

In conventional systems, a Boolean variable may be used to track, report, and clear fault notifications. For example, in accordance with IEEE 802.1Q, a system using the MAdefectIndication for simply defining whether or not a fault exists is not able to provide other information that can be useful for maintenance and control. Therefore, the embodiments of the present disclosure are configured to overcome the deficiencies of the conventional systems and are configured to further provide an extension to IEEE 802.1Q.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a block diagram illustrating an embodiment of a Maintenance Domain (MD) 10 in which continuity faults are tracked and reported. In this embodiment, the MD 10 includes Node A and Node B, which may be referred to as Network Elements (NEs). Port 2 of Node A is connected to Port 3 of Node B. Port 1 of Node A includes an Up MEP 12 and Port 4 of Node B also includes an Up MEP 14. The MD 10 may be configured to provide Operation, Administration and Maintenance (OAM) functionality by means of various fault notifications (e.g., alarms, SNMP traps, Syslog messages, Telemetry Notifications, etc.).

Conventional systems may utilize the MD 10 in a manner that might create issues. For example, in accordance with the IEEE 802.1Q (CFM) standard, the Boolean variable is used for tracking, reporting, and clearing fault notifications, without any known solutions for specifically identifying various types of faults at different priority levels in the MEPs 12 and 14 present in MD 10.

Although some systems may support the detection of various faults at different priority levels, which may range from 1 to 5, where a fault at priority level 5 is considered to be the highest level fault and a fault at priority level 1 is considered to be the lowest level fault. In some cases, a notification may be transmitted of the highest level fault in the MD 10. However, conventional systems may only communicate this highest level at a first time when one or more faults are detected and a "fault_present" flag (e.g., a one-bit Boolean variable) is set. This fault_present flag is TRUE whenever there is any service fault present on the MD 10 and is FALSE whenever there are no service faults present on the MD 10 (i.e., when MD 10 is fault-free). This flag (variable) for fault tracking may be present for each service instance.

The fault_present flag is defined in IEEE 802.1Q as the MAdefectIndication for tracking the faults for each CFM service instance. This is a Boolean variable which is TRUE whenever any fault is present on a CFM service. There are some issues with CFM standards' current handling of the clearing and reporting of alarms. In particular, the conventional systems are unable to track multiple faults at different priority levels in the MEPs 12 and 14 present in MD 10. As a result, the conventional systems do not communicate the highest priority level of remaining (or existing) faults when there are multiple faults at different priority levels and one or more additional faults are discovered or one or existing faults are rectified or resolved (and no longer exist), particularly when the lower priority level changes. In this case, the notification for the new active highest priority defect' is not reported and the notification for clearing of the older highest priority defect is also not communicated, as the condition of the variable 'MAdefectindication continues to remain TRUE in this case. This creates problems during fault notification clearing as the standard prevents the sending of a clear notification for a fault until the CFM service becomes fault free.

To further explain the issues of the conventional operations, the following two problems are described:

Problem 1: Notification of a Lower Priority Fault is not Cleared when a Notification of a Higher Priority Fault is Generated For example, suppose at time t=0, a priority 3 service fault is detected at Node A of the MD 10. A fault_present variable (e.g., flag) is set to TRUE to indicate the presence of any number of faults. Also, a notification may be generated to define the priority 3 fault as the highest level fault and this notification is transmitted to a management system, such as via a SNMP trap, telemetry event, syslog event, alarm notification, and the like.

Suppose, for example, that at a subsequent time t=1, a priority 5 service fault is detected at Node A. The fault_present variable continues to be TRUE, so no update is needed in this regard. Also, a notification may be generated to define the priority 5 fault as the highest level fault and this notification is transmitted to the management system.

However, there is no procedure in the conventional systems that clear the previous notification of the priority 3 fault being the highest level fault. Specifically, there is no CLEAR notification in conventional systems for the lower priority fault (i.e., priority 3 fault) since the conventional procedures are configured to track all the faults through the one variable (e.g., fault_present, MAdefectIndication, etc.), as the customer would like to be notified about only the highest priority defect on a service.

In this case of sequential fault notifications, where a higher priority fault is detected and tracked (and a corresponding high priority alarm is reported) after a lower priority fault is detected and tracked (and a corresponding low priority alarm is reported), the higher priority alarm gets reported properly, but the low priority alarm is not cleared.

Referring again to FIG. 1, an Up MEP 12 is created on port 1 of Node A and an Up MEP 14 is created on port 4 of Node B. If service faults are detected (and tracked) on the MEP in the MD 10 in a sequential manner where a lower priority fault is detected first (e.g., the lower priority alarm is raised first) before the generation of a new, higher priority fault on the same CFM service, then, as per the IEEE 802.1Q standard, there is no CLEAR fault notification generated for the lower priority alarm. Although the new higher priority alarm is reported in this case, the old lower priority alarm is not cleared.

In one example, suppose a RMEP CCM fault (e.g., a level 3 fault) is present in the CFM service of the MD 10 and Node A reports this fault to the management system. Also, suppose a cross-connect (xcon) fault (e.g., a level 5 fault) is subsequently detected as being present in the CFM service of the MD 10, then the alarm for cross-connect fault (e.g., level 5) would be reported, but the alarm for the RMEP CCM fault (e.g., level 3) would be shown as an active alarm even though it is no longer the highest priority fault at that time.

Problem 2: Notifications are not Updated when there are Multiple Faults and the Highest Priority Fault is Rectified on a Service In this case, suppose that at time t=0, a priority 4 service fault is detected on Node A. A fault_present variable is set to TRUE and a fault notification for the priority 5 fault is transmitted to management system. Also, suppose that at subsequent time t=1 (or at the same time t=0), a priority 4 service fault is detected on Node A. Obviously, the fault_present variable remains set to TRUE. Since this new (or concurrent) fault has a lower priority than the currently active higher-priority fault, no notification is generated in this case, which is expected since it is not the highest priority fault. Suppose that at time t=2, the priority 5 fault is rectified (or the service is restored with respect to this fault). This leaves the priority 4 fault as the highest level active fault on the service. However, since the conventional systems do not provide any mechanisms for tracking individual faults, the priority 5 fault alarm (notification) will not be cleared and a new alarm or notification for a new highest-level fault (priority 4 fault) will not be generated and reported. Therefore, the conventional systems do not allow any type of update regarding the highest level fault or for communicating this information to the management system.

Even if the highest priority fault is cleared from the service having multiple faults on multiple priority levels, a notification to clear the alarm corresponding to the higher priority fault is not sent. In FIG. 1, the Up MEP 12 is created on port 1 of Node A and the Up MEP 14 is created on port 4 of Node B. Suppose there are multiple faults on the CFM service at Node A, such as a cross-connect (xcon) fault (e.g., priority 5 fault) and an error CCM fault (e.g., priority 4 fault). If the xcon fault (e.g., level 5) is rectified or resolved, the conventional systems do not clear the alarm notification corresponding to the xcon fault and do not transmit any notification to this effect to the management system.

In the situation where there are multiple faults and the highest priority fault is resolved, not only do the conventional systems fail to send a notification that this highest priority fault is cleared, but also the conventional systems fail to send a notification that a remaining fault at a lower priority level is now the highest level active fault.

Therefore, to overcome the deficiencies of the conventional systems for operating a Maintenance Domain (e.g., MD 10) according to the IEEE 802.1Q standard, the following embodiments of the present disclosure are able to track the faults on each priority level individually. Also, the present embodiments are configured to notify the management system when the priority level of the highest-level fault changes, such as when new faults are detected or when old faults are resolved and a different priority level is analyzed as currently being the highest level.

In the case of the highest priority fault being resolved (i.e., no longer active), a notification of the next highest priority fault that is still active is not normally reported for the CFM service. The next highest priority fault (e.g., level 4 priority, error CCM fault) remains on the CFM service, but this not reported as a fault notification in the conventional systems.

Figure 2:
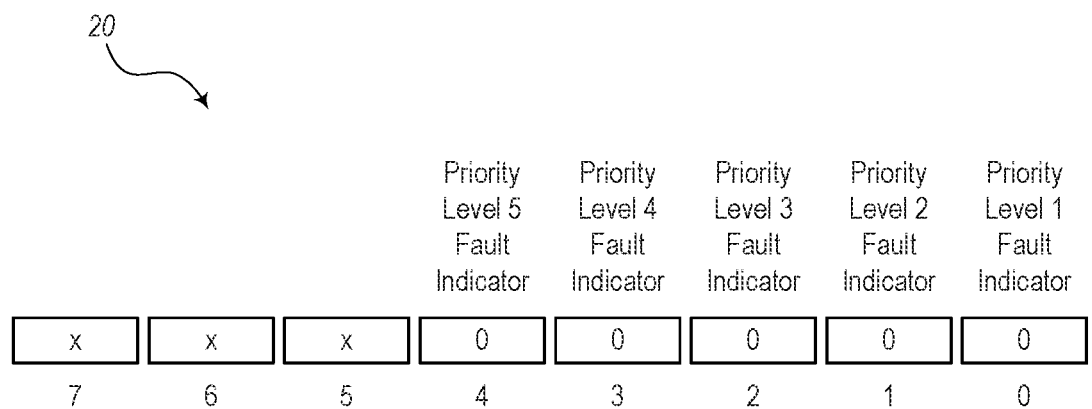
FIG. 2 is a diagram illustrating a fault indication variable for individually indicating a plurality of faults at a plurality of priority levels, according to various embodiments of the present disclosure.

FIG. 2 is a diagram illustrating an embodiment of a fault indication variable 20 for individually tracking or indicating a plurality of faults at a plurality of priority levels. In this embodiment the fault indication variable 20 is one byte (i.e., eight bits) in bit positions 0 to 7, shown from right to left in FIG. 2. In this example, the fault indication variable 20 is configured to track faults at five different priority levels (e.g., priority level 1, priority level 2, priority level 3, priority level 4, and priority level 5). It should be noted that in other embodiments, the fault indication variable 20 may be configured to indicate fault at any number of levels.

As illustrated in FIG. 2, there are five bits in bit positions 0-4, where each of these bits respectively represents a fault indicator at a specific priority level (e.g., priority levels 1-5, respectively). A bit value of 0 represents a FALSE fault condition, or, in other words, signifies that there is not fault at that particular priority level. A bit value of 1 represents a TRUE fault condition, or, in other words, signifies that there is a fault at that particular priority level. Since each bit represents a particular priority level, the fault indication variable 20 is configured to show the fault condition at each and every priority level. As an example, if the value of the portion of the fault indication variable 20 making up bits 4 through 0 is 01100, then it can be deduced that there is one or more faults at each of priority levels 4 and 3 and there are no faults at prior levels 5, 2, and 1.

Thus, the fault indication variable 20 is configured as an improvement over the Boolean MAdefectIndication and may be represented by a plurality of bits (e.g., one byte or eight bits), that is the MAdefectIndication is changed from a Boolean to a byte vector variable. In some embodiments, the bits not used for specifically designating a priority level (e.g., bits in bit positions 7 through 5) may be considered to be "Don't Care" (DC) bits. As shown in FIG. 2, the first three bits (e.g., 7-5) may be designated as DC bits, represented in FIG. 2 by an "x." According to other embodiments (e.g., the embodiment described with respect to FIG. 4), these three unused bits may be utilized for other notifications, which may be conceived based on an understanding of the present disclosure and/or as developed in the future.

The used bits (e.g., bits 4 through 0) in this embodiment may be used for denoting the CFM faults. Since the CFM standard currently defines five different levels of faults, those five bits are utilized. In the future, if the CFM standard is modified to include more or fewer priority levels, it should be noted that the fault indication variable 20 described in the present disclosure may also be altered accordingly to accommodate the individual tracking of each of the applicable priority level faults. It should also be noted, as described above, that more than one bit can be set (e.g., raised to one) at any time based on the current fault condition on the CFM service.

The IEEE 802.1Q standard also defines a "Lowest_Alarm_Priority," whereby only faults at or above this value are considered. Faults at priority levels below the Lowest_Alarm_Priority are ignored. In this respect, the fault indication variable 20 of FIG. 2 may be configured to mark the bits at bit positions below the Lowest_Alarm_Priority as Don't Care (x) bits and will not be part of the fault notification strategies described in the present disclosure.

Node A (FIG. 1) may be configured to store the fault indication variable 20 as a "current fault indication variable." Thereafter, this fault indication variable may be referred to as an "previous fault indication variable." When the fault status of Node A changes (e.g., when a new fault at a previously fault-free priority level is detected and/or when an existing fault at a previously faulty priority level is resolved), then the fault indication variable 20 will be updated with the new information for indicating at what priority levels faults now exist. The updated fault indication variable 20 may then be considered to be a new "current fault indication variable" and can be compared with the previous fault indication variable.

Node A is configured to store the old variable (i.e., previous fault indication variable) in memory and then store the new variable (i.e., current fault indication variable) in memory as well, which may later be used to replace the previous fault indication variable after the processing steps discussed in the present disclosure, such as after a decision is made on reporting/clearing a fault.

The fault indication variable 20 may be updated every time a fault condition becomes active/clears on a CFM service. Initially, when the MEP in a MA present in the MD 10 is first deployed, there may be no faults. In this case, the previous fault indication variable and current fault indication variable will be xxx 00000 for each CFM service.

Therefore, with the fault indication variable 20 in use in the MD 10, an Operations, Administration, and Maintenance (OAM) system (or Node A itself) may be configured to track the existence or absence of a plurality of faults on Node A (or at a monitored Network Element (NE)) somewhere within a network domain (e.g., MD 10). Each of the plurality of faults can be categorized in one of a plurality of priority levels (e.g., priority levels 1-5). In response to a detection of one or more new faults in the NE or a rectification of one or more old faults in the NE, the OAM system (or Node A) may be configured to update the fault indication variable 20 that individually signifies the existence or absence of a fault at each of the priority levels.

According to additional embodiments, the fault indication variable 20 may be an extension of the MAdefectIndication variable defined in the Connectivity Fault Management (CFM) protocol of IEEE 802.1Q. Fault indication variable is a local variable which is used to track the CFM faults on local node. This variable is not shared with other nodes in the network. Based on the changes in this variable, the MEP Fault Notification Generator state machine will send the fault raised/cleared notifications to the NMS.

The plurality of priority levels, according to various embodiments, may include a highest priority level for tracking cross-connect (Xcon) Continuity Check Message (CCM) faults (DefXconCCM, DefErrorCCM, DefRemoteCCM, DefMACstatus, DefRDICCM), a second-highest priority level for tracking error CCM faults, a third-highest priority level for tracking Remote Maintenance End Point (RMEP) CCM faults, a fourth-highest priority level for tracking Media Access Control (MAC) status faults, and a fifth-highest priority level for tracking Remote Defect Indication (RDI) faults. Also, the plurality of priority levels may be based on an impact that the respective faults have on service performance in the network domain.

The fault indication variable may be a new (or current) fault indication variable. The tracking and reporting systems and methods may include a step of comparing a most significant set-bit of the fault indication variable with a most significant set-bit of a previous fault indication variable to determine if the highest priority fault remains the same. For example, the aspect of being the "most significant" refers to the highest bit position (e.g., 0-4) in the fault indication variable 20. Also, the aspect of being a set-bit refers to the bit having a value of one. If the highest priority fault does not remain the same from the previous fault indication variable to the new fault indication variable, the systems and the methods of the present disclosure may be configured to report an alarm that signifies a new highest priority level fault being set and an old highest priority level fault being cleared. The fault indication variable 20 may include one or more bits configured for signifying the highest priority level fault that exists in the NE.

As a result, the fault indication variable 20 is an improvement over the conventional "fault_present" or "MAdefectIndication" Boolean variable. By extending the fault indication variable 20 to multiple bits, it is possible to individually track faults at each of the priority levels for individual bits tracking of the different priority faults that are newly detected or cleared from a service instance. Without the fault indication variable 20, the conventional systems are unable to support a mechanism to track individual faults, which will essentially result in the problems with fault notification or reporting mentioned above. Without the present fault indication variable 20, the conventional systems are unable to correctly notify newly detected (active) faults on a service, especially when there are multiple faults on the service. For example, the embodiments of the present disclosure are able to track individual faults and clear fault notifications as needed, which provides at least the benefits of accurately notifying the management system of the true status of faults and priority levels.

The embodiments of the present disclosure are configured to support OAM via a fault notification (e.g., fault reporting, alarms, etc.) technique for different kinds of faults/defects. The fault reporting may be supported for each service instance on the system. The fault notifications may be configured as alarms, telemetry, Syslog data, Simple Network Management Protocol (SNMP) traps, etc.

A user (e.g., network operator, administrator, manager, or other personnel at an OAM facility, a Network Management System (NMS) facility, etc.) may have certain expectations to allow for analysis of accurate fault status on a system. Particularly, the embodiments of the present disclosure may be configured to support the tracking and reporting of multiple faults simultaneously. For example, the present systems and methods may be configured to notify the user about the highest priority fault that presently exists on a service at any time, even when a fault_present flag does not change, such as when there are multiple faults present (and when more faults are detected and/or some faults are resolved while other remain). Also, the systems and methods of the present disclosure may communicate information to the user about the highest priority level of faults remaining, even when the types of faults change over time. Furthermore, the systems and methods can accurately report to the user what types of faults are currently active in the system, and particularly those faults which may have an impact on the service performance.

Referring again to FIG. 2, the fault indication variable 20 has bit positions 4-0 representing the highest priority level faults through the lowest priority level faults. A "Lowest_Alarm_Priority" variable may be generated for indicating the lowest priority level of which the system is configured to track. In this respect, the system does not consider or attempt to notify the fault having a priority level below this variable. The bits with priority value less than the Lowest_Alarm_Priority value will be ignored for fault notification. These bits may be considered as "Don't Care" (DC or x) bits. It should be noted that even though the fault indication variable 20 is shown with DC bits in the 7-5 bit positions, the fault indication variable 20 may include any suitable bit assignment where the five valid bits may be located at any suitable positions (e.g., positions 7-3, 6-2, 5-1, etc.) and the DC bits can be filled in at the empty spots as needed.

The "previous fault indication variable" may be generated from the fault indication variable 20, which may be stored as the previous value for indicating the previous state of the service. This variable may be updated after a decision is made on reporting/clearing a fault. The fault indication variable 20 may be updated every time a fault condition becomes active/clears on a CFM service.

According to one example, suppose the fault indication variable 20 is updated. The systems and methods of the present disclosure may be configured to find the first occurrence (e.g., proceeding in a direction from the Most Significant Bit (MSB) at bit position 7 to the Least Significant Bit (LSB) at bit position 0) of a set (i.e., having value "1") bit in the "previous fault indication variable." Since the three bits at bit positions 7 through 5 may be DC bits, the test for finding the first occurrence of "1" may therefore begin at bit position 4 in the illustrated embodiment.

Also, the systems and methods of the present disclosure may be configured to find the first set bit (i.e., having value "1") in the current fault indication variable, again proceeding from the MSB to the LSB direction, while skipping the DC bits. The present embodiments may be configured to check if the first occurrence of a "1" bit (detected at a particular bit position) in the current (new) fault indication variable is the same as the first occurrence of a "1" bit (detected at a particular bit position) in the previous (old) fault indication variable. If so, then it can be determined that the highest priority level remains the same, such as if a lower priority level fault is rectified while the highest priority level fault remains. With respect to updating the management system, no action is needed at this point.

However, if the first occurrence of the "1" bit in the new and old fault indication variables is different, then it can be determined that the highest priority level fault has changed. In other words, this condition may be detected when there are multiple faults and the highest level fault is rectified while one or more lower level faults remain. In this case, the systems and methods of the present disclosure may be configured to transmit an alarm or notification for the highest priority level fault. For example, if both a level 5 fault and level 3 fault are present and the level 5 fault is cleared (i.e., rectified or resolved), then the management system can be informed that the level 3 fault is now the highest priority level active fault on the service. This is an improvement over conventional systems and is able to notify (e.g., in one notification) that the highest level fault is no longer active and that the lower level fault is now the highest level fault that still remains. At this point, the previous fault indication variable can be updated with the value of the current (new) fault indication variable, which can be used for comparison in the future when the fault status changes next.

Therefore, to demonstrate the validation of the present embodiments with respect to the problems of the conventional systems, the following explanation is provided.

Validation for the Solution to Problem 1: Notification of a Lower Priority Fault is not Cleared in Conventional Systems when a Notification of a Higher Priority Fault is Generated Again, suppose a priority level 3 fault is detected on the service and its fault notification is generated and transmitted. The fault indication variable 20 (i.e., recorded as the "previous" fault indication variable) in this case will be xxx 00100. Thereafter, a priority level 5 fault is detected on the service. The fault indication variable 20 (i.e., recorded as the "current" fault indication variable) is updated in this case and will have a value of xxx 10100.

The first occurrence of a set bit in the current (new) variable is at bit position 4 (e.g., which represents priority level 5). The first occurrence of a set bit in the previous (old) variable is a bit position 2 (e.g., which represent priority level 3). The techniques of the present disclosure include determining if the first occurrences are the same. If so, then no action would need to be taken. However, since the first occurrences are different in this case, the systems and methods are configured to take the actions of transmitting a first alarm to set the priority level at 5 and transmitting a second alarm to clear the notification with respect to the previous highest priority level being 3. The two fault notifications may be transmitted for NEs that may be operating according to IEEE 802.1Q but are not necessarily in compliance with the strategies described in the present disclosure. Thus, the present disclosure may be configured to operate in any system operating under IEEE 802.1Q and/or the extension to IEEE 802.1Q discussed herein. Furthermore, the record of the "previous" fault indication variable can then be updated with the "current" fault indication variable to enable the same types of comparisons for subsequent fault status changing scenarios.

Validation for the Solution to Problem 2: Notifications are not Updated in Conventional Systems when there are Multiple Faults and the Highest Priority Fault is Rectified on a Service Again, suppose there are level 5 priority faults and level 4 priority faults present on a service. The previous (old) variable will be recorded as xxx 11000. Thereafter, suppose the priority 5 fault clears (e.g., is rectified or resolved) and the current (new) variable is updated and recorded as xxx 01000.

When searching for the first occurrences of the set bits, the first occurrence in the new variable is found to be at bit position 3 (e.g., representing a priority 4 fault). The first occurrence in the old variable is found to be at bit position 4 (e.g., representing a priority 5 fault). The systems and methods check if the first set bit occurrences are the same and are found to be different. Again, the conventional systems do not perform any actions at this point since at least one fault still remains. However, according to the embodiments of the present disclosure, the systems and methods described herein are configured to send a clear notification for priority level 5 defect based on occurrence of 1st set bit position in previous value of MAdefectIndication. Also, the systems are configured to transmit a report notification for priority level 4 defect based on occurrence of 1st set bit position in new value of MAdefectIndication. These notifications may be transmitted as a part of one single notification or separate notifications and may be based on the compliance of the NEs with the IEEE 802.1Q standard and/or the modification to the IEEE 802.1Q standard as defined in the present disclosure. Once again, the "previous" variable is updated with the information from the "new" variable for future comparisons.

Figures 3, 4:
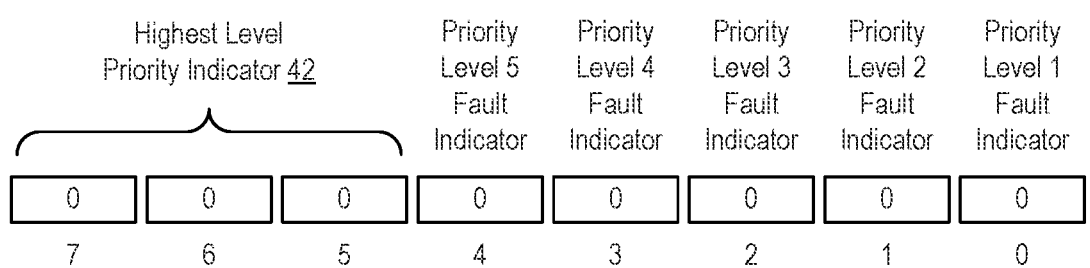
FIG. 3 is a table illustrating descriptions of different priority levels of different types of defects in the MD, according to various embodiments.
FIG. 4 is a diagram illustrating another fault indication variable for individually indicating a plurality of faults at a plurality of priority levels and for indicating the highest level priority fault that currently exists in the MD, according to various embodiments of the present disclosure.

FIG. 3 is an example of a table 30 illustrating descriptions of different priority levels of different types of defects in the MD 10. In this embodiment, the table 30 shows a plurality of priority levels ranging from a highest priority level 5 (having the highest importance) to a lowest priority level 1 (having the lowest importance). The table 30 includes a highest priority level for tracking cross-connect (Xcon) Continuity Check Message (CCM) faults (DefXconCCM, DefErrorCCM, DefRemoteCCM, DefMACstatus, DefR-DICCM), a second-highest priority level for tracking error CCM faults, a third-highest priority level for tracking Remote Maintenance End Point (RMEP) CCM faults, a fourth-highest priority level for tracking Media Access Control (MAC) status faults, and a fifth-highest priority level for tracking Remote Defect Indication (RDI) faults. The plurality of priority levels 1-5 may be based on an impact that the respective defects have on service performance in the MD 10. It should be noted that the embodiments of the present disclosure may be configured to operate with respect to other types of faults, other priority lists, etc. For example, the embodiments may be configured to conform to any system of priority levels having any number of levels and any types of faults and be modified accordingly based on whatever priority systems may be used. In some embodiments, the fault indication variable 20 may include fewer or more bit positions for fewer or more fault types. For example, the fault indication variable 20 may include additional bytes if the fault priority system includes more than 8 priority levels.

FIG. 4 is a diagram illustrating another fault indication variable 40 for individually indicating a plurality of faults at a plurality of priority levels. Also, the fault indication variable 40 is configured to indicate a highest level priority fault that currently exists on the MEP. The fault indication variable 40 is similar to the fault indication variable 20 of FIG. 2, except that the fault indication variable 40 may include additional information placed in the unused DC bit positions of FIG. 2. For example, bit positions 7-5 of fault indication variable 40 (or any three bits at any position in the fault indication variable 40) may be used to designate a highest level priority indicator 42. The highest level priority indicator 42 may include any number of bits needed to specify the highest level fault. For example, if the first occurrence of a set bit in bit positions 4-0 is at position 4 (e.g., representing a priority level 5 fault), then the highest level priority indicator 42 (e.g., bit positions 7-5) may be 101 to designate level 5 fault being the highest level. Similarly, if the first occurrence of a set bit in bit positions 4-0 is at position 3 (e.g., representing a priority level 4 fault), then the highest level priority indicator 42 (e.g., bit positions 7-5) may be 100 to designate level 4 fault being the highest level. Similarly, if the first occurrence of a set bit in bit positions 4-0 is at position 2 (e.g., representing a priority level 3 fault), then the highest level priority indicator 42 (e.g., bit positions 7-5) may be 011 to designate level 3 fault being the highest level. Similarly, if the first occurrence of a set bit in bit positions 4-0 is at position 1 (e.g., representing a priority level 2 fault), then the highest level priority indicator 42 (e.g., bit positions 7-5) may be 010 to designate level 2 fault being the highest level. Similarly, if the first occurrence of a set bit in bit positions 4-0 is at position 0 (e.g., representing a priority level 1 fault), then the highest level priority indicator 42 (e.g., bit positions 7-5) may be 001 to designate level 1 fault being the highest level. Other bits values (or combinations thereof) of the highest level priority indicator 42 may be used to designate the various highest priority levels and/or to designate other aspects that may be conceived from an understanding of the present disclosure.

Figure 5:
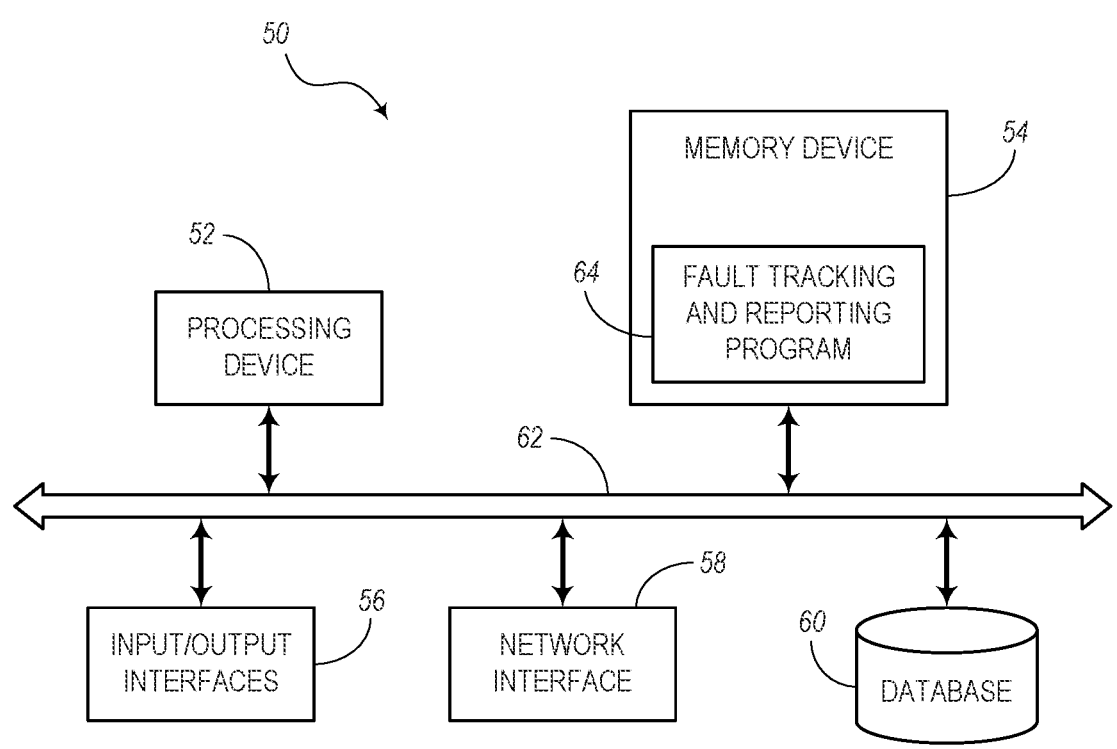
FIG. 5 is a block diagram illustrating a computing system of an Operations, Administration, and Maintenance (OAM) system or node in an MD, according to various embodiments.

FIG. 5 is a block diagram illustrating an embodiment of a computing system 50 of an Operations, Administration, and Maintenance (OAM) system or node (e.g., Node A) in an MD. In the illustrated embodiment, the computing system 50 may be a digital computing device that generally includes a processing device 52, a memory device 54, Input/Output (I/O) interfaces 56, a network interface 58, and a database 60. It should be appreciated that FIG. 5 depicts the computing system 50 in a simplified manner, where some embodiments may include additional components and suitably configured processing logic to support known or conventional operating features. The components (i.e., 52, 54, 56, 58, 60) may be communicatively coupled via a local interface 62. The local interface 62 may include, for example, one or more buses or other wired or wireless connections. The local interface 62 may also include controllers, buffers, caches, drivers, repeaters, receivers, among other elements, to enable communication. Further, the local interface 62 may include address, control, and/or data connections to enable appropriate communications among the components 52, 54, 56, 58, 60.

It should be appreciated that the processing device 52, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 52 may also include or utilize stored program instructions (e.g., stored in hardware, software, and/or firmware) for control of the computing system 50 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 54 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 54 may incorporate electronic, magnetic, optical, and/or other types of storage media. The memory device 54 may have a distributed architecture, where various components are situated remotely from one another, but can be accessed by the processing device 52.

The memory device 54 may include a data store, database (e.g., database 60), or the like, for storing data. In one example, the data store may be located internal to the computing system 50 and may include, for example, an internal hard drive connected to the local interface 62 in the computing system 50. Additionally, in another embodiment, the data store may be located external to the computing system 50 and may include, for example, an external hard drive connected to the Input/Output (I/O) interfaces 56 (e.g., SCSI or USB connection). In a further embodiment, the data store may be connected to the computing system 50 through a network and may include, for example, a network attached file server.

Software stored in the memory device 54 may include one or more programs, each of which may include an ordered listing of executable instructions for implementing logical functions. The software in the memory device 54 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 52), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 52 or other suitable circuitry or logic). For example, when executed, the instructions may cause or enable the processing device 52 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 52), or any suitable combination thereof. Software/firmware modules may reside in the memory device 54, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 56 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 56 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The network interface 58 may be used to enable the computing system 50 to communicate over a network, section of a network, or network domain (e.g., Maintenance Domain (MD) 10 of FIG. 1), the Internet, a Wide Area Network (WAN), a Local Area Network (LAN), and the like. The network interface 58 may include, for example, an Ethernet card or adapter (e.g., 10BaseT, Fast Ethernet, Gigabit Ethernet, 10 GbE) or a Wireless LAN (WLAN) card or adapter (e.g., 802.11 a/b/g/n/ac). The network interface 58 may include address, control, and/or data connections to enable appropriate communications on the network or MD 10.

The computing system 50 also includes a fault tracking and reporting program 64, which may be configured in any suitable combination of software, firmware, or middleware on the memory device 54 (or other suitable non-transitory computer-readable media) and/or hardware on the processing device 52. The fault tracking and reporting program 64 may be configured to perform the various functions described throughout the present disclosure and/or may be configured to enable or cause the processing device 52 (or any suitable combination of one or more processors) to perform the functions.

In particular, the fault tracking and reporting program 64 may be configured to track the existence or absence of a plurality of faults in a Network Element (NE) within a network domain. Each of the plurality of faults may be categorized in one of a plurality of priority levels. In response to a detection of one or more new faults in the NE or a rectification of one or more old faults in the NE, the fault tracking and reporting program 64 may be configured to or enable the processing device 52 to update a fault indication variable that individually signifies the existence or absence of a fault at each of the priority levels.

Figure 6:
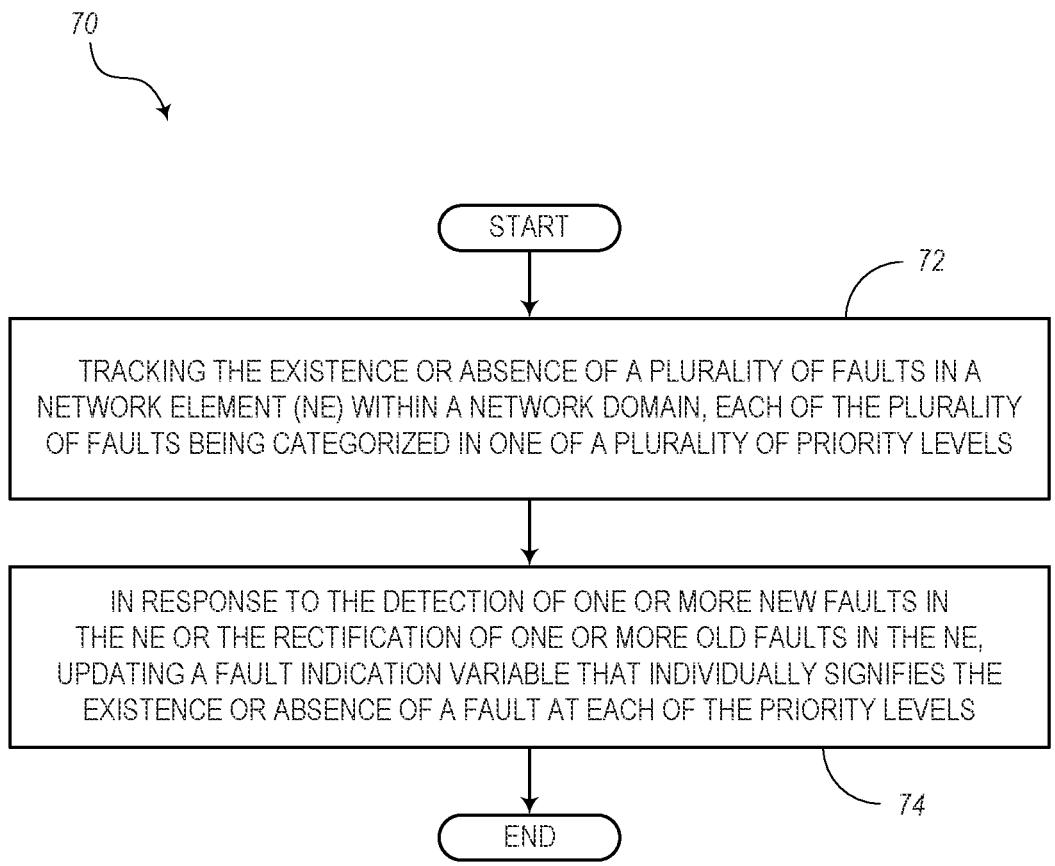
FIG. 6 is a flow diagram illustrating a process for tracking faults at different priority levels in a network domain, according to various embodiments.

FIG. 6 is a flow diagram illustrating an embodiment of a process 70 for tracking faults at different priority levels in a network domain. For example, the process 70 may include a step of tracking the existence or absence of a plurality of faults in a Network Element (NE) within a network domain, as indicated in block 72, whereby each of the plurality of faults may be categorized in one of a plurality of priority levels. In response to a detection of one or more new faults in the NE or a rectification of one or more old faults in the NE, the process 70 is configured to update a fault indication variable that individually signifies the existence or absence of a fault at each of the priority levels, as indicated in block 74.

According to additional embodiments, the fault indication variable may be an extension of the Boolean MAdefectIndication variable defined in the Connectivity Fault Management (CFM) protocol of IEEE 802.1Q. The process 70, in some embodiments, may further include the step of reporting the fault notifications to a management system. For example, reporting the fault notifications may include utilizing an Operations, Administration, and Maintenance (OAM) system.

In addition, the process 70 may further be defined whereby the plurality of priority levels may include a highest priority level for tracking cross-connect (Xcon) Continuity Check Message (CCM) faults (DefXconCCM, DefErrorCCM, DefRemoteCCM, DefMACstatus, DefRDICCM), a second-highest priority level for tracking error CCM faults, a third-highest priority level for tracking Remote Maintenance End Point (RMEP) CCM faults, a fourth-highest priority level for tracking Media Access Control (MAC) status faults, and a fifth-highest priority level for tracking Remote Defect Indication (RDI) faults. For example, the plurality of priority levels may be based on an impact that the respective faults have on service performance in the network domain.

The fault indication variable described above may be referred to as a new fault indication variable. Therefore, the process 70 may further include the step of comparing a most significant set-bit of the fault indication variable with a most significant set-bit of a previous fault indication variable to determine if the highest priority fault remains the same. If the highest priority fault does not remain the same from the previous fault indication variable to the new fault indication variable, the process 70 may include reporting one or more alarms that signify a new highest priority level fault being set and an old highest priority level fault being cleared. The fault indication variable in some embodiments may also include one or more bits configured for signifying the highest priority level fault that exists on a service.

Therefore, the systems and methods of the present disclosure may provide many benefits with respect to the conventional systems, as discussed throughout the present disclosure. For example, the enhanced variable definition allows the tracking of multiple faults on a service in a network at once. The present embodiments provide a logic mechanism for reporting and clearing faults on a service as needed without waiting from a fault_present flag to flip. The present protocol provides an extension to the IEEE 802.1Q standard for more accurate tracking and reporting and overcomes the problems of conventional system operating in accordance with IEEE 802.1Q without the present extension. The present disclosure provides implementations for improved OAM (or node) performance to reduce the load on Network Management Systems (NMSs) or other management and control system. The present implementations do not require any additional special handling of the fault notification logic to perform fault notification reporting, clearing, etc., at the management system, since they may already be handled at the device level.

The present embodiments provide a solution which is applicable to multiple type of devices that support fault notification reporting and clearing. The implementations may be deployed or incorporated into various widely used components, such as Layer 2 (L2) OAM protocol system, which may operate under CFM protocols. Devices running the logic described herein (e.g., fault tracking and reporting program 64) may be configured to demonstrate an enhanced OAM performance as compared to other devices which do not support the present implementations. If implemented in devices from a common vendor, the devices may include the fault indication variable 40 of FIG. 4 for communicating additional information in one byte and can provide enhanced OAM performance. At the same time, there is no problems in the inter-operations with devices from a different vendor. For example, in this case, the fault indication variable 20 of FIG. 2 which may be used to report the fault notification of a higher priority defect (if necessary) and clear the fault notification of a lower priority defect (if necessary). The logic of the present implementations allows for these features on the local NE (Node A) or a supervisory/control device operating on a control plane with respect to the MD 10.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A computing system comprising:
a processing device, and
a memory device configured to store a computer program having instructions that, when executed, enable the processing device to
track the existence or absence of a plurality of faults in a Network Element (NE) within a network domain, each of the plurality of faults being categorized in one of a plurality of priority levels, and
in response to a detection of one or more new faults in the NE or a rectification of one or more old faults in the NE, update a fault indication variable that individually signifies the existence or absence of a fault at each of the priority levels, wherein the fault indication variable includes a plurality of bits to individually track faults at each of the priority levels, and wherein the fault indication variable is used for the MAdefectIndication variable defined in the Connectivity Fault Management (CFM) protocol defined in IEEE 802.1Q.

2. The computing system of claim 1, wherein the instructions further enable the processing device to report fault notifications to a management system based on the fault indication variable.

3. The computing system of claim 2, wherein reporting the fault indication variable includes utilizing an Operations, Administration, and Maintenance (OAM) system.

4. The computing system of claim 1, wherein the plurality of priority levels includes a highest priority level for tracking cross-connect Continuity Check Message (CCM) faults, a second-highest priority level for tracking error CCM faults, a third-highest priority level for tracking Remote Maintenance End Point (RMEP) CCM faults, a fourth-highest priority level for tracking Media Access Control (MAC) status faults, and a fifth-highest priority level for tracking Remote Defect Indication (RDI) faults.

5. The computing system of claim 1, wherein the plurality of priority levels are based on an impact that the respective faults have on service performance in the network domain.

6. The computing system of claim 1, wherein the fault indication variable is stored as a new fault indication variable, and wherein the instructions further enable the processing device to compare a most significant set-bit of the new fault indication variable with a most significant set-bit of a previous fault indication variable to determine if the highest priority fault remains the same.

7. The computing system of claim 6, wherein, if the highest priority fault does not remain the same from the previous fault indication variable to the new fault indication variable, the instructions further enable the processing device to report one or more fault notifications that signify a new highest priority level fault being set based on the first set bit of the new fault indication variable and an old highest priority level fault being cleared based on the first set bit of the old fault indication variable.

8. The computing system of claim 1, wherein the fault indication variable includes one or more bits configured for signifying the highest priority level fault that exists in the NE.

9. The computing system of claim 1, wherein some or all bits of the plurality of bits each represent a different priority level fault indicator from CFM.

10. The computing system of claim 9, wherein other bits from the some or all bits of the plurality of bits are used to identify changes in highest-level faults.

11. The computing system of claim 1, wherein the network domain is a Maintenance Association (MA) and the network element is a Maintenance association End Point (MEP).

12. A non-transitory computer-readable medium configured to store computer logic having instructions that, when executed, cause one or more processing devices to:
tracking the existence or absence of a plurality of faults in a Network Element (NE) within a network domain, each of the plurality of faults being categorized in one of a plurality of priority levels, and
in response to a detection of one or more new faults in the NE or a rectification of one or more old faults in the NE, updating a fault indication variable that individually signifies the existence or absence of a fault at each of the priority levels,
wherein the fault indication variable includes a plurality of bits to individually track faults at each of the priority levels, and wherein the fault indication variable is used for the MAdefectIndication variable defined in the Connectivity Fault Management (CFM) protocol defined in IEEE 802.1Q.

13. The non-transitory computer-readable medium of claim 12, wherein the instructions further cause the one or more processing devices to report fault notifications to a management system based on the fault indication variable.

14. The non-transitory computer-readable medium of claim 12, wherein the plurality of priority levels includes a highest priority level for tracking cross-connect Continuity Check Message (CCM) faults, a second-highest priority level for tracking error CCM faults, a third-highest priority level for tracking Remote Maintenance End Point (RMEP) CCM faults, a fourth-highest priority level for tracking Media Access Control (MAC) status faults, and a fifth-highest priority level for tracking Remote Defect Indication (RDI) faults.

15. A method comprising the steps of:
tracking the existence or absence of a plurality of faults in a Network Element (NE) within a network domain, each of the plurality of faults being categorized in one of a plurality of priority levels, and
in response to a detection of one or more new faults in the NE or a rectification of one or more old faults in the NE, updating a fault indication variable that individually signifies the existence or absence of a fault at each of the priority levels,
wherein the fault indication variable includes a plurality of bits to individually track faults at each of the priority levels, and wherein the fault indication variable is used for the MAdefectIndication variable defined in the Connectivity Fault Management (CFM) protocol defined in IEEE 802.1Q.

16. The method of claim 15, further comprising the step of reporting based on the fault indication variable to a management system associated with the network domain.

17. The method of claim 15, wherein the plurality of priority levels includes a highest priority level for tracking cross-connect Continuity Check Message (CCM) faults, a second-highest priority level for tracking error CCM faults, a third-highest priority level for tracking Remote Maintenance End Point (RMEP) CCM faults, a fourth-highest priority level for tracking Media Access Control (MAC) status faults, and a fifth-highest priority level for tracking Remote Defect Indication (RDI) faults, wherein the plurality of priority levels are based on an impact that the respective faults have on service performance in the network domain.

18. The method of claim 15, wherein the fault indication variable is stored as a new fault indication variable, and wherein the method further comprises the step of comparing a most significant set-bit of the new fault indication variable with a most significant set-bit of a previous fault indication variable to determine if the highest priority fault remains the same;
If the highest priority fault does not remain the same from the previous fault indication variable to the new fault indication variable, the method includes the step of reporting one or more fault notification that signify a new highest priority level fault being set based on the first set bit of the new fault indication variable and an old highest priority level fault being cleared based on the first set bit of the old fault indication variable.

19. The method of claim 15, wherein the fault indication variable includes one or more bits configured for signifying the highest priority level fault that exists in the NE.

20. The method of claim 15, wherein the NE supports simultaneous detection of multiple faults of different priority levels on a same entity/service.

* * * * *